(12) United States Patent
Levin et al.

(10) Patent No.: US 10,587,406 B1
(45) Date of Patent: Mar. 10, 2020

(54) FILE SYSTEM ENCRYPTION WITH KEY ROTATION

(71) Applicant: Amazon Technologies, Inc., Seattle, WA (US)

(72) Inventors: Alex Levin, Cupertino, CA (US); Ron Diamant, Albany, CA (US); Georgy Zorik Machulsky, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 15/380,956

(22) Filed: Dec. 15, 2016

(51) Int. Cl.
*H04L 9/16* (2006.01)
*H04L 9/06* (2006.01)
*H04L 9/08* (2006.01)
*G06F 21/62* (2013.01)

(52) U.S. Cl.
CPC ............ *H04L 9/16* (2013.01); *G06F 21/6218* (2013.01); *H04L 9/0643* (2013.01); *H04L 9/0863* (2013.01); *H04L 9/0869* (2013.01); *G06F 2221/2107* (2013.01)

(58) Field of Classification Search
CPC ....... H04L 9/16; H04L 9/0861; H04L 9/0894; H04L 9/0897; H04L 9/0863; H04L 9/0869; G06F 21/6218; G06F 21/6209; G06F 21/62; G06F 2221/2107
USPC .......................................................... 380/46
See application file for complete search history.

(56) References Cited

U.S. PATENT DOCUMENTS

| | | | |
|---|---|---|---|
| 9,071,429 B1* | 6/2015 | Roth ..................... | H04L 9/0894 |
| 2002/0107806 A1* | 8/2002 | Higashi ................... | G06F 21/10 |
| | | | 705/51 |
| 2011/0022856 A1* | 1/2011 | Ureche ................. | G06F 21/602 |
| | | | 713/193 |
| 2011/0195696 A1* | 8/2011 | Fogel ...................... | H04L 51/38 |
| | | | 455/414.1 |
| 2014/0230007 A1* | 8/2014 | Roth ................... | G06F 21/6209 |
| | | | 726/1 |
| 2015/0088853 A1* | 3/2015 | McDonald ............ | G06F 16/168 |
| | | | 707/711 |
| 2016/0277373 A1* | 9/2016 | Murray ................. | H04L 63/061 |
| 2016/0335447 A1* | 11/2016 | Guo ..................... | G06F 21/6218 |
| 2018/0054303 A1* | 2/2018 | O'Toole ................ | H04L 9/0822 |
| 2018/0248689 A1* | 8/2018 | Hu ........................ | H04L 9/3242 |

* cited by examiner

*Primary Examiner* — Ashokkumar B Patel
*Assistant Examiner* — William B Jones
(74) *Attorney, Agent, or Firm* — Davis Wright Tremaine LLP (57) ABSTRACT

Data within a file system may be protected using a key rotation scheme. The key rotation scheme may include a data key and a metadata key. The data key may be used to encrypt data portions of the file system while the metadata key may be used to encrypt the metadata of the file system. The metadata key may be generated based at least in part on a user input and may be rotated at the end of a key rotation interval.

20 Claims, 7 Drawing Sheets

FILE SYSTEM ENCRYPTION WITH KEY ROTATION

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others connected through external networks. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Modern cryptographic algorithms provide high levels of data security. Current encryption methods, for example, can secure data such that unauthorized access to the data requires an impractical amount of time and/or resources. Such high-levels of protection, however, come at a cost. Generally speaking, higher levels of protection require higher levels of care and greater expenditure of computational resources. At the same time, it may be inefficient and/or impractical to employ such high levels of data security at certain levels or at a certain scale. As an example, data and files stored in a file system may be encrypted; however, rotating and other protections of the encryption key and data may be impractical due to the large amount of computational resources required. Generally, a lot of computational resources are required to effectively protect data within a file system, resulting in decreased security, over utilization of computational resources, and exposure of sensitive data, among other issues.

BRIEF DESCRIPTION OF THE DRAWINGS

Various techniques will be described with reference to the drawings, in which.

DETAILED DESCRIPTION

Techniques and systems described below relate to a key rotation strategy for robustly ensuring the security of a file system, files, data objects, and other data maintained in a storage device. As described above, encrypting a file system and rotating or otherwise changing the encryption key can result in computationally expensive operations. Specifically, when changing an encryption key for an entire file system, the entire file system must be decrypted with the previous cryptographic key and then re-encrypted with the new cryptographic key. To solve this problem and provide the technical advantage of increasing security, two independent encryption keys are used to encrypt particular portions of a file system.

In one example, a data encryption key and a metadata encryption key are used to encrypt the data and metadata contained in the file system, respectively. The data encryption key may be randomly generated cryptographic material or may be a combination of randomly generated cryptographic material and user input (e.g., user password or hash of a user password). The data encryption key may be rotated at a low rate relative to the metadata encryption key or may not be rotated at all due to the computational resources required to change the data encryption key. The metadata key may be derived from user-generated input material and may be combined with other cryptographic material such as a random constant value. For example, the metadata key may include a user password combined with a randomized value and provided as an input to a cryptographic hash function (e.g., Secure Hash Algorithm 3 (SHA-3)). The output of the cryptographic hash function may be used as the metadata key. In addition, the metadata key may be rotated frequently. As described in greater detail below, the portion of the file system containing metadata may be significantly smaller (e.g., 100-1,000 times smaller) than the portion of the file system containing other data (e.g., files).

The metadata key may be rotated using a variety of different key rotation schemes as described below. In one embodiment, the metadata key may be rotated by performing a number of iterations on cryptographic key materials (e.g., user input and/or random number) using the cryptographic hash function. For example, the first metadata key may be calculated using a single iteration of an input over the cryptographic hash function, and the second metadata key may be two iterations of the input over the cryptographic hash function. This process may be continued for any number of iterations, for example, until the user changes their password. Furthermore, rotation of the metadata key ensures that if the metadata key is compromised, it is only compromised until the metadata key is rotated. In one example, the data key is encrypted with the metadata key to protect the data key and increase the security of the file system encryption.

In addition, under this key rotation strategy, an attacker would require both the data key and the metadata key to obtain access to the encrypted file system. The information contained in the metadata is required to reconstruct a data object such as a file from the file system. For example, the metadata may refer to or point to various locations on a disk or other storage device (e.g., on-demand storage service provided by a computing resource service provider) where all or a portion of a particular file is located. In yet other embodiments, a portion of a file's header and/or footer may be encrypted with the metadata key. Whenever the metadata key is rotated, the metadata (and file header and/or footer, if encrypted) may be decrypted and re-encrypted with the new metadata key. This process will have a lower computational resource requirement than decrypting and re-encrypting the entire file system. Furthermore, the key rotating scheme may provide perfect forward secrecy in which the current set of keys may not be compromised by any previous set of keys.

In a distributed computing environment, the metadata key may be recreated based at least in part on information provided by a user. For example, the user includes a password or other credential information in an application program interface (API) request that is used by the computing resource service provider to recreate the metadata key by performing a certain number of iterations on the information provided using a cryptographic hash function. The metadata data key may then be used by the computing resource service provider to decrypt file system metadata and determine the location of data requested by the user. In yet other embodiments, recreation of the metadata key and/or decryption of the data key is performed by a computing device operated by the user.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
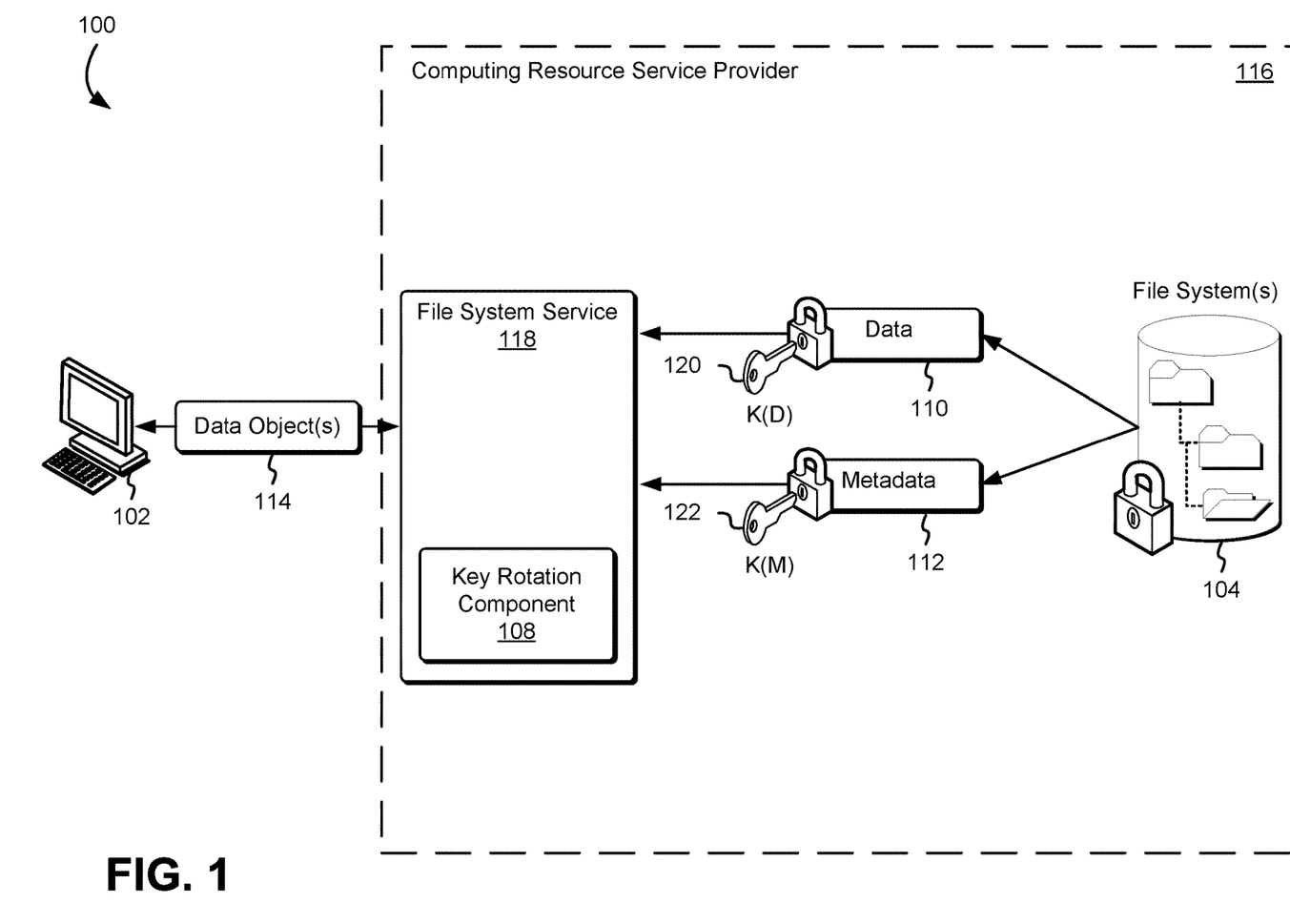
FIG. 1 illustrates an environment in which a key rotation component may be used to encrypt data within a file system in accordance with an embodiment.

FIG. 1 illustrates an environment 100 in which a key rotation scheme may be used to protect data stored within a file system 104 in accordance with an embodiment. A computing resource service provider 116 may provide a file system service 118 with a key rotation component 108, and the file system service 118 may encrypt the file system 104 and maintain a data key 120 and a metadata key 122 used to encrypt the file system. The computing resource service provider 116 may provide users 102 with access to storage resources, such as the file system 104, using one or more services such as the file system service 118 which may include a block-level storage service and/or an on-demand storage service. The computing resource service provider 116 may operate computing resources (e.g., servers in a data center) and expose the computing resources to the user 102 through various services described below.

The key rotation component 108 may be hosted by a set of computing resources provided by the computing resource service provider. The key rotation component 108 may generate the data key 120 and the metadata key 122 for use by the file system service 118 in processing storage requests. For example, when receiving a read request from the customer 102, the file system service 118, as described in greater detail below, decrypts the file system 104 metadata 112 and traces the metadata to locate and assemble the data 110. The file system service 118 may then decrypt the data 110 and provide the decrypted data object 114 (e.g., file) to the customer 102. In addition, the key rotation component 108 may also periodically and aperiodically rotate the metadata key 122 and/or the data key 120. As described in greater detail below, the metadata key 122 and/or the data key 120 may be generated based at least in part on an input from the user such as a hash of the user's username and password. The file system 104 may include any type of file system suitable for storing data objects 114, such as files or other data. In addition, the file system may be contained within a storage volume or logical storage volume described in greater detail below.

The file system 104 provides the user 102 a mechanism for organizing and storing data objects. The file system 104 may be organized into data 110 and metadata 112. The data may include binary representation of values persisted on a storage device by the user 102. The metadata includes information associated with each data object 114 and/or file within the file system 104 such as the length of the data contained in a particular data object 114 and/or file, a number of blocks or bytes allocated for a particular data object 114 and/or file, a timestamp indicating when a particular data object 114 and/or file was last modified, information indicating when a particular data object 114 and/or file was created, information indicating when metadata associated with a particular data object 114 and/or file was created or modified, information indicating when a particular data object 114 and/or file was last backed up or restored, user information associated with a particular data object 114 and/or file, access permissions for a particular data object 114 and/or file, or any other information associated with a particular data object 114 and/or file as described below.

In various embodiments, the file system 104 stores all the metadata associated with the data objects 114 contained in the file system 104 including the file name, the length of the contents of a file, and the location of the file in the folder hierarchy separate from the contents of the file. The metadata may be stored in a structure separate from the data objects 114 contained in the file system 104 such as the "inode." For example, an inode is a data structure which describes data objects 114 (e.g., a file or a directory), and each inode stores the attributes location(s) of the data objects' 114 data (e.g., the binary values persisted on the storage device). As described in greater detail below in connection with FIG. 3, the inode provides a hierarchical data structure, such as a tree and node structure, for maintaining the metadata of the file system 104.

In one example, the user 102 may request a particular data object maintained by the file system 104 from the file system service 118. The key rotation component 108 may obtain the metadata key 122 and provide the file system service 118 with access to the metadata key 122 so that the file system metadata 112 may be decrypted. In addition, the key rotation component 108 may also recreate the metadata key 122 based at least in part on information obtained from the user 102 or may simply obtain the metadata key from persistent storage in response to authentication and/or authorization of the user request. In some embodiments, the key rotation component 108 only decrypts a portion of the file system 104 metadata. For example, the key rotation component 108 may decrypt the root node of the inode and only decrypt the other nodes of the inode required to obtain the information associated with the particular data object. The data key 120 may be stored in the root node or otherwise encrypted with the metadata key 122.

Once the encrypted metadata 112 is decrypted, the key rotation component 108 or other component of the file system service 118 may obtain the encrypted data 110 of the particular data object from the file system 104 based at least in part on the decrypted metadata. For example, the key rotation component 108 or other component of the file system service 118 may request a particular block associated with the particular data object as indicated in the metadata from a storage resource provided by the computing resource service provider 116. Once the encrypted data 110 is obtained, the key rotation component 108 or other component of the file system service 118 may decrypt the encrypted data 110 and return the plaintext data object to the user 102. Multiple variations of the environment 100 are within the scope of the present disclosure. For example, the key rotation component 108 may be integrated with another system or service of the computing resource service provider 116 such as a key management service. In addition, the key rotation component 108 or other computing device may include a trusted platform module or other cryptographic device.

Figure 2:
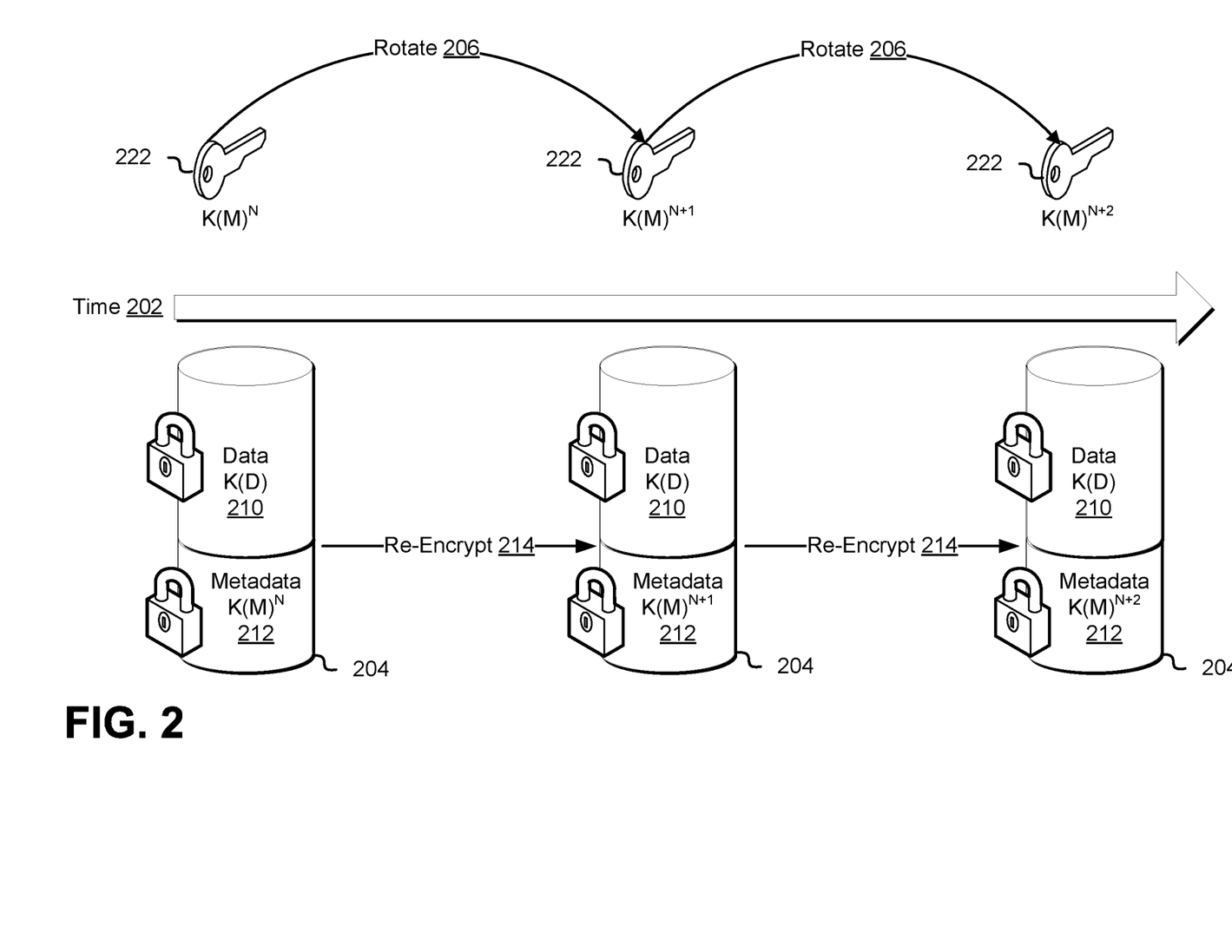
FIG. 2 illustrates a diagram in which various aspects of a key rotation strategy are shown in accordance with an embodiment.

FIG. 2 is a diagram in which various aspects of a key rotation scheme and file system encryption are illustrated in accordance with an embodiment. As described above, key rotation may involve replacing keys with other keys to prevent security threats such as the collection of enough decrypted data to allow practical cracking of a cipher used. Various embodiments of the present disclosure allow for enhanced security of encrypted file systems 204 and/or logical storage volumes in connection with key rotation regimes. Accordingly, FIG. 2 illustrates key rotation and re-encryption of data in accordance with an embodiment. The key rotation scheme may be performed by a key rotation described above or any system configured with privileges to cause key rotation, which may be the same system (e.g., same device) that utilizes the cryptographic key(s) to perform cryptographic operations or a separate system (e.g., not the same device).

Time 202 is illustrated in FIG. 2 as an arrow across the diagram. At various intervals of time 202 a metadata key 222, as described above, may be rotated 206. The metadata key 222 may be rotated 206 using a variety of different techniques and algorithms. However, regardless of the techniques or algorithms used to generate and rotate the metadata key 222 or other cryptographic key described in the present disclosure, perfect forward secrecy may be maintained. Perfect forward secrecy ensures that long-term cryptographic keys (e.g., data key 210) do not compromise short-term keys (e.g., metadata key). In addition, perfect forward secrecy ensures that previous short-term keys do not compromise future short-term keys. For example, by generating a random or pseudo-random value used in computing the metadata key 222 and/or the data key 210, without using a deterministic algorithm to compute the metadata key 222 and/or the data key 210, perfect forward secrecy may be achieved. Inclusion of the random value ensures that if a previous key is compromised, other keys are not compromised as well.

As described above, the key rotation component or other computing system generating the keys may, utilizing user input and/or a random or pseudo-random value, apply a cryptographic hash function repeatedly over the input n number of times. For example, a user password may be provided as an input to a SHA-3 cryptographic hash function, and the output may be used as an input into the SHA-3 cryptographic function n−1 times (the first output of the Sha-3 cryptographic hash function may be considered the first iteration of n number of time). The metadata key 222 may be rotated at various intervals of time 202. For example, the metadata key 222 may be rotated once a day, where n represents a number of days. As another example, the metadata key 222 may also be rotated when the user updates the user password or other value used to generate the metadata key 222. Furthermore, the user input may include a variety of different data including biometric information, facial recognition, pattern matching information, explicit data, implicit data, any other data obtained from the user operating a computing device responsible for providing at least a portion of the user input. For example, the computing device may capture an image or fingerprint of the user and provide information associated with the image or fingerprint to a key rotation service or other service described herein as user input. In another example, user input may be obtained from a plurality of computing devices such as a camera, biometric device, or other device capable of obtaining a user input.

In addition, when the user updates or changes the user password or other value used to generate the metadata key 222, n may be reset. For example, the metadata key 222 may be considered a product on $K(M)^n$ where K is the cryptographic hash function, M is the user password or other input value, and n is the number of iterations of the cryptographic hash function. When the user first provides a password, it may be used as an input into K and n may be considered 0. At the end of the first key rotation period (e.g., the first day), the next metadata key 222 may be generated by increasing n by one. This process may be repeated until the input M is changed and then n may be reset.

Returning to the embodiment depicted in FIG. 2, when the file system 204 is encrypted all the metadata is encrypted with the metadata key 222, and all the data is encrypted with the data key 210. However, it should be noted that a portion of the data may be encrypted with the metadata key 222 as well, for example, a portion of a file header and/or footer may be encrypted with the metadata key 222. Other variations of the encryption pattern are considered within the scope of the present disclosure. Regardless of how the metadata key 222 is rotated 206, the process of key rotation will generate a new metadata key which may be stored at a particular location of the file system 204 such as the root node of an inode data structure or a particular set of blocks within the file system 204. In addition, information used to generate the new metadata key may be generated and encrypted. For example, the value n may be incremented and encrypted and stored within the file system 204 in a similar manner as the new metadata key. By storing information used to generate the new metadata key, the new metadata key may be recreated if, for example, the new metadata key is lost or destroyed or the user is attempting to access the file system 204 from a different computer system a new metadata key may be created. In addition, the value n may be decremented in which case the value n would be set to the maximum number of times the metadata key 222 is to be rotated and decremented until the value of n equals 0 or the user password is reset.

Once the new metadata key is created, the entire metadata of the file system 204 may be re-encrypted. This process may be performed by the key rotation component or a process (e.g., kernel level application) of a storage server supporting the file systems as described in greater detail below in connection with FIG. 4. Furthermore, the previous metadata key is required to decrypt the metadata of the file system 204 before it can be re-encrypted using the new metadata key. The previous metadata key may be obtained from memory or recreated based at least in part on user input or other information used to generate the key. Once the file system 204 has been decrypted or at some point in time when the previous metadata key is no longer required, the previous metadata key may be destroyed (e.g., electronically shredding the key). The new metadata may be stored or may be destroyed; since the metadata key 222 can be recreated, it is not required that the new metadata key be stored in the file system 204 or other location.

The metadata key 222 may be recreated based at least in part on the value n described above. For example, the value n may be tracked and modified every time the metadata key is rotated 206. Once modified the new value of n may be encrypted using a key that is known or easy to recreate, such as the user's public key or the first metadata key (e.g., where the number of iterations of the user input in the cryptographic hash function is 1). In this manner, the value n may be determined and the current metadata key may be recreated. Other mechanisms for recreating the key are within the scope of the present disclosure. For example, the value n may be derived from a timestamp, a log, or other information that may be used to recreate the metadata key 222.

As another example of key rotation and recreation, when the user creates and/or replaces the user password, the key rotation service or other computer systems may generate n random values and store the n random values such that the random values may be obtained by the user and used to recreate the metadata key 222. For example, the n random values may be stored in a particular location within the file system 204. When a new metadata key is generated, the user input may be combined (e.g., combined using a mathematical operation such as exclusive or (XOR)) with a particular random value selected from the n random values. The particular random value may be determined based at least in part on a timestamp, set order of the random values, or as a result of iterating through the set of random values. The number of random values may correspond to an interval of time during which the user password is valid. For example, if the user password is valid for 90 days, 90 random values may be generated and used to create one new metadata key for each day. Theses number may be modified to match different password validity periods and/or key rotation epochs (e.g., an interval of time at the expiration of which the metadata key 222 is rotated 206). In addition, all or a portion of the metadata key 222 may be obtained from a security module such as a hardware security module or a trusted platform module. In some embodiments, the value n may be an initialization vector(s) or other cryptographic material suitable for making the metadata key 222 or data key 210 more robust. In yet other embodiments, the value n is an index representing or indicating a set of operations to be performed on the user input and/or the metadata key 222 to obtain cryptographic material suitable for making the metadata key 222 or data key 210 more robust.

Figure 3:
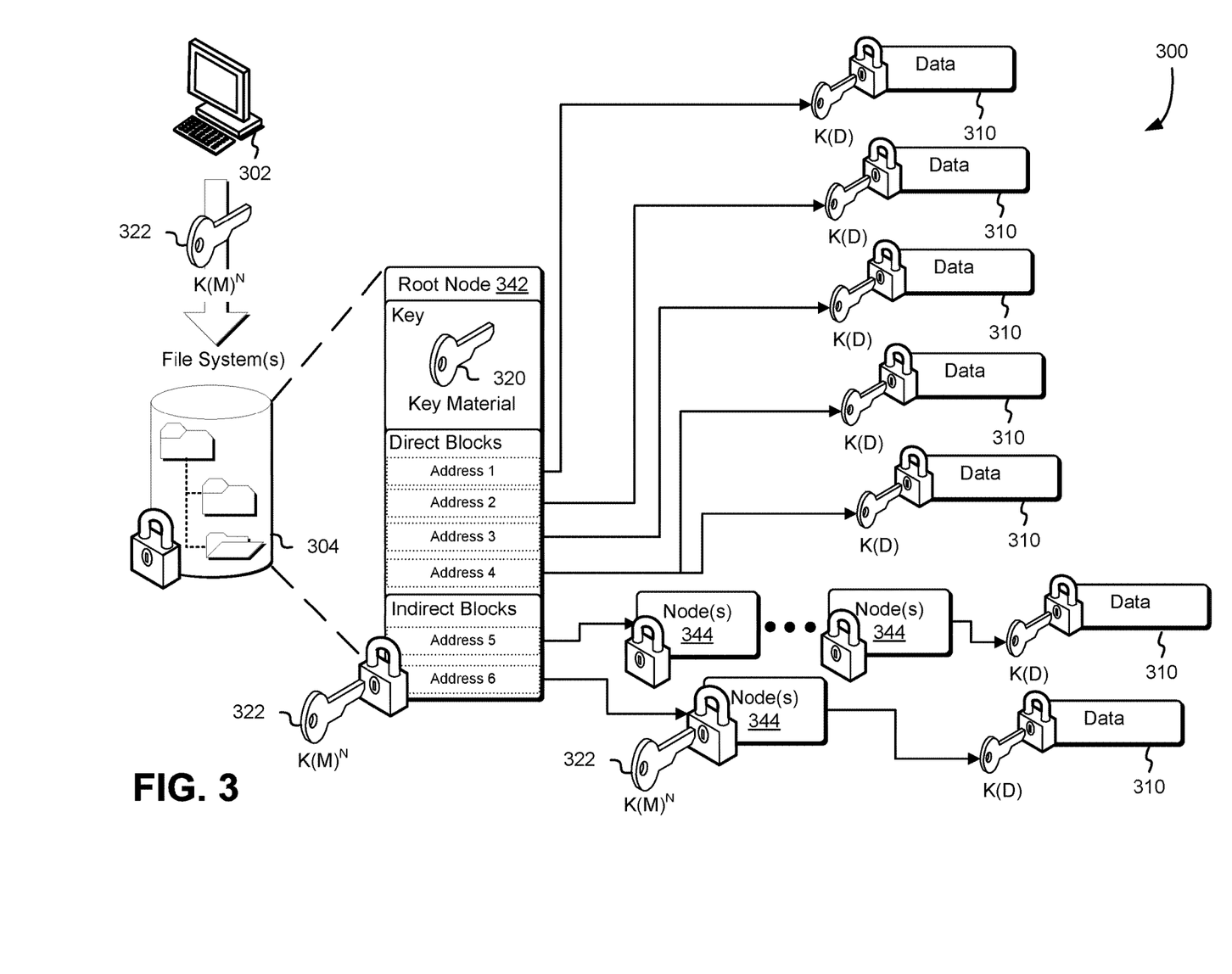
FIG. 3 illustrates an environment in which a file system may be encrypted using a key rotation strategy in accordance with an embodiment.

FIG. 3 illustrates an environment 300 in which a file system may be encrypted using a key rotation strategy in accordance with an embodiment. A user 302 may utilize a metadata key 322 and a data key material 320 to access an encrypted file system 304. The user 302 may be a customer of a computing resource service provider as described above or other entity utilizing the key rotation and encryption techniques described in the present disclosure. The file system 04 may be contained in a storage device or remote storage device and may be part of a storage volume, partition, or logical storage volume associated with the user 304. The user 302 may operate a computing device which includes computing devices provided by the computing resource service provider or service thereof, such as a virtual computing instance provided to the user 302 by a virtual computing service.

As described above, the user 302 may utilize the metadata key 322 to decrypt the metadata of the file system 304. The metadata key 322 may be recreated based at least in part on information provided by the user 302. For example, the user's login credentials may be used as key material in a cryptographic algorithm to generate the metadata key 322. In some embodiments, the user metadata key 322 may be used to decrypt additional information required to recreate the current version of the metadata key as described above. In yet other embodiments, a key management service may provide the metadata key 322 to the user 302.

To access the encrypted file system 304, the metadata key 322 may be used to decrypt the root node 342. The metadata may include a data structure stored at a particular location of the file system 304. As illustrated in FIG. 3, the metadata may indicate the location of data 310 stored within the file system 304. For example, the root node 342 may include storage addresses (e.g., blocks) where data 310 is located. A particular node in the metadata may reference multiple locations of blocks where data 310 is located. In addition, each node 344 in the metadata may be encrypted with the metadata key 322. The data 310 may include portions of files or data objects. In addition, the root node 342 may reference one or more additional nodes 344 which may contain additional information that may be used to access, obtain, generate, and/or recreate data 310. For example, a portion of the data 310 for a file may be directly referenced in the root node 342, and a second portion of the data 310 for the file may be indirectly referenced. The indirect reference may include information indicating one or more additional nodes 344 of the metadata that are required to be decrypted to locate the data 310. Without the information contained in the metadata and the root node 342, an attacker may be unable to recreate the files or other data objects contained in the file system 304.

As illustrated by FIG. 3, the data key material 320 may be encrypted with the metadata key 322 and stored in the root node 342. The data key material 320 may be a portion of the data encryption key that may be used to recreate the data encryption key. For example, the data key material 320 may be combined with the user input in a cryptographic function to generate the data encryption key. Other mechanisms to store information or a portion thereof to recreate an encryption key are considered within the scope of the present disclosure. For example, the data key material 320 stored in the root node 342 includes a random value that when combined with the user input can be used to create the data encryption key. By storing the data encryption key or a portion thereof, such as the data key material 320, in the root node 342, the data encryption key may be protected from attack while still accessible when accessing the file system 304. When accessing a file or other data object from the file system 304, the metadata key may be used to decrypt the metadata, obtain the data key material 320, and determine the location of the data 310 based at least in part on the decrypted metadata. The user's 302 computing device, or other computer system such as the key rotation component described above, may assemble the data 310 based at least in part on the decrypted metadata and decrypt the data 310 using the data key material 320. The decrypted data 310 may be assembled into the file or data object. The files or data objects maintained in the encrypted file system 304 may be decrypted in response to a request. Furthermore, the entire file system 304 may be decrypted or only a portion of the file system may be decrypted. For example, only the files or data object interacted with by the user 302 or expected to be interacted with by the user 302 may be decrypted.

In some embodiments, the metadata key 322 may be required to decrypt a portion of the file or data object. For example, a portion of the data 310 may be encrypted with the metadata key 322. The portion of the data 310 encrypted with the metadata key 322 may be indicated in the metadata (e.g., the root node 342 or additional nodes 344). This may increase security of the file system 304 and ensure that if the data key is compromised, an attacker may not be able to assemble an entire file or data object in plaintext.

Figure 4:
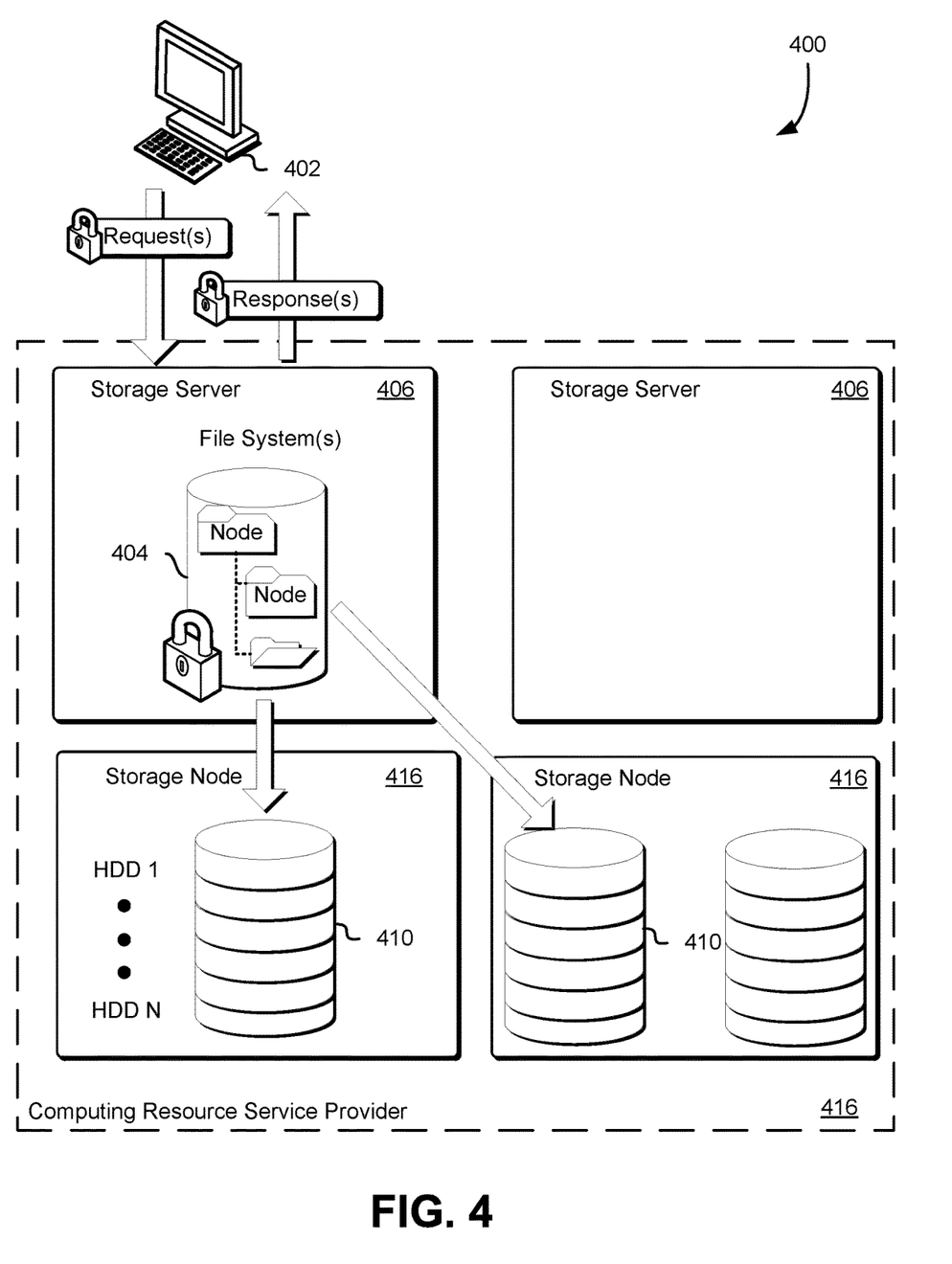
FIG. 4 illustrates an environment in which customers may communicate with storage servers containing encrypted file systems using a key rotation strategy in accordance with an embodiment.

FIG. 4 illustrates an example environment 400 where one or more computer systems, including one or more processors that execute instructions, provide a user 402 with encrypted file systems 404 wherein logical volume(s) containing the encrypted file systems 404 may be stored by a computing resource service provider 416 using one or more storage servers 406. The storage service may utilize one or more storage nodes 416 to maintain and/or store data. User 402 data may be stored across a variety of different data storage nodes 416 (managed by the one or more storage services 406) containing one or more storage devices such as block-level storage devices, illustrated in FIG. 4 as HDDs 1 through N 410. The user data stored on the different devices may be exposed to a computer system operated by the user as a logical volume and/or file system 404. Described in greater detail below, the user 402 may instantiate one or more virtual machines on computing resources of the computing resource service provider 416, and the one or more virtual machines may attach the exposed logical volumes to enable the customer to interact with the file system 404 stored in the logical volumes maintained by a remote storage service using one or more storage servers 406. The logical volume may contain one or more files or data objects which may be simultaneously accessible to multiple computer systems operated by the users 402.

As illustrated by FIG. 4, the storage nodes 416 may include a pool or other collection of storage devices 1 through N configured to store data on behalf of the user 402 and managed by the one or more storage servers 406. The storage servers 406 may include network interfaces, racks, switches, HDDs, solid-state drives or other storage devices, processors, memory, or any other physical component of the storage servers 406 to enable the user 402 to store the file system 404 within the storage nodes 416. The storage servers 406 may also include software or other executable code such as logical volume placement algorithms, operating systems, hypervisors, key management applications, encryption applications, or other applications managing user 402 access to computing resources of the storage servers 406 and storage nodes 416. For example, the storage service 406 may include a process or application that rotates the metadata key and/or data key. As another example, the storage server 406 may include a process or application that processes requests from the user 402 and decrypts files or data objects in response to the request and provides the user 402 with a decrypted file or data object. In various embodiments, if the storage servers 406 detects idle time, the storage servers 406 may generate a new data key and re-encrypt the file system 404. This may increase the security provided by the key rotation scheme described in the present disclosure.

In some examples, a "volume" is a logical storage space within a data storage system in which data objects may be stored. The logical data storage volume may be identified by a volume identifier. Data for the logical data storage volume may reside in one physical storage device (e.g., a hard disk) or may comprise multiple partitions distributed across multiple storage devices. The logical volume may contain a file system 404 as described in the present disclosure.

The logical data storage volume may be comprised of a set of storage nodes. In some examples, a "storage node" refers to one of a set of storage devices (e.g., hard drives) usable for hosting storage volumes. Thus, a storage node may host multiple volumes which may or may not be assigned to the same user. For example, a first volume associated with a first user may be comprised of blocks A, B, C, and D on storage nodes W, X, Y, and Z, respectively. A second volume associated with a second user may be comprised of blocks E, F, G, and H, also on respective storage nodes W, X, Y, and Z.

The logical data storage volume may be operationally attached to the computing device operated by the user 402 to serve as a logical storage unit (e.g., virtual drive) for the computing device. Note, however, it is also contemplated that the logical data storage volume as described in the present disclosure could alternatively be operationally connected to a physical (i.e., non-virtual) computing device. The logical data storage volume may enable the persistent storage of data used/generated by an operationally attached computer system (physical or virtual).

The requests illustrated in FIG. 4 may include API requests. The API request to interact with the file system 404 may require a particular location of the file system and the key (e.g., metadata key or data key) required to decrypt data stored at the particular location. In yet other embodiments, decrypting of the data may be performed at the computing device operated by the user 402. For example, the user 402 may request data or a data object from the storage servers 406, and the storage servers 406 may provide the encrypted data or data object. The user's 402 computing device may utilize the metadata key and/or data key to decrypt the information obtained from the storage servers 406. Other variations of this process are considered within the scope of the present disclosure.

Figure 5:
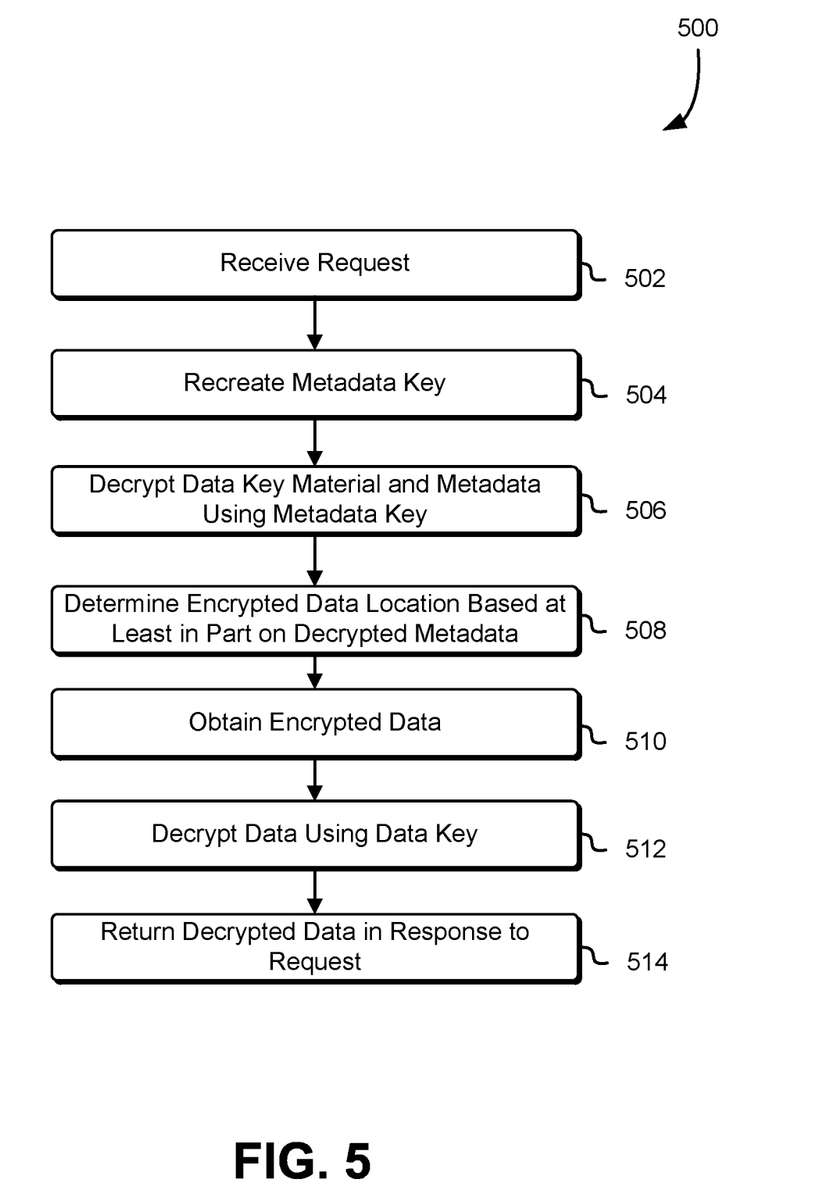
FIG. 5 illustrates a process for performing an operation on an encrypted file system utilizing a key rotation strategy in accordance with an embodiment.

FIG. 5 is a block diagram illustrating an example of a process 500 for performing an operation on an encrypted file system utilizing a key rotation strategy in accordance with an embodiment. The process 500 may be performed by any suitable system such as a key rotation component or storage service described above in connection with FIGS. 1 and 4. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 500 includes receiving a request 502. The request may be a request to access an encrypted file system (e.g., attach the file system to a particular computing device) or may be a request to access a particular file or location within the encrypted file system. The request may be obtained from a computing device operated by a user as described above. The system executing the process 500 may then recreate a metadata key associated with the encrypted file system 504. The metadata key may be recreated based at least in part on user credential and/or a user password. Furthermore, additional information such as a time stamp or a value indicating a number of iteration of a cryptographic hash function may be required to recreate the metadata key or the most recent version of the metadata key.

The system executing the process 500 may then decrypt a data key or data key material and metadata of the file system using the metadata key 506. As described above, the encrypted file system is encrypted using a data key and a metadata key. The data key may be used to encrypt all or a portion of the data maintained in the file system. Furthermore, the data key or data key material may be encrypted using the metadata key and stored in a specific location within the file system such as a root node as described above.

The metadata includes information about the data contained within the file system as described above, such as the location of blocks of data within the file system. The system executing the process 500 may then determine the location of encrypted data based at least in part on the decrypted metadata 508. As described above, the metadata may include information indicating portions of the file system where data is located and/or information indicating other nodes or portions of the metadata including information indicating portions of the file system where data is located. Based at least in part on the information contained in the metadata, the system executing the process 500 or other system may be able to generate a data object or file from the blocks of data stored within the file system.

With the location information obtained from the metadata, the system executing the process 500 may then obtain the encrypted data 510. Obtaining the encrypted data may include transmitting an input/output request to a storage device (local or remote) or transmitting an API request to a remote data storage service. In addition, a hypervisor or other device may obtain the encrypted data on behalf of the system executing the process 500. Once the encrypted data has been obtained, the system executing the process 500 may decrypt the data using the data key 512. The data may be encrypted using a variety of reversible encryption algorithms such that the data may be decrypted using the data key. The system executing the process 500 may then return the decrypted data in response to the request 514. This may include transmitting the data over a network to a computing device operated by the user. Alternatively, the response to the request may indicate that the data is decrypted and accessible to the user.

In numerous variations of the process 500, one or more of the operations performed in 502-514 may be performed in various orders and combinations, including in parallel. Furthermore, one or more of the operations may be performed by various computing devices. For example, decryption of the data and/or metadata may be performed by a computer device operated by the user to reduce exposure of sensitive data.

Figure 6:
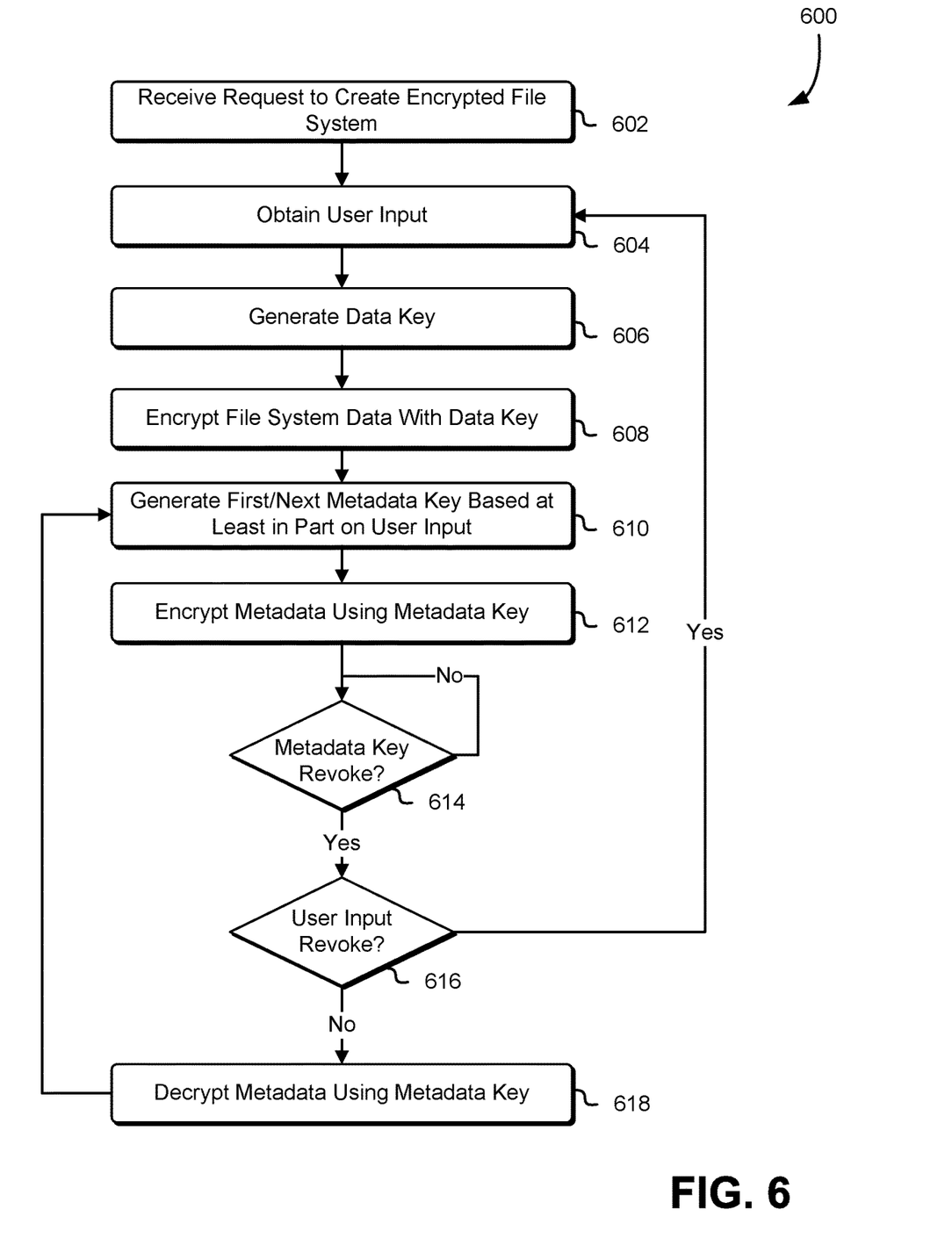
FIG. 6 illustrates a process for securing a file system using a key rotation strategy in accordance with an embodiment.

FIG. 6 is a block diagram illustrating an example of a process 600 for securing a file system using a key rotation strategy in accordance with an embodiment. The process 600 may be performed by any suitable system such as a key rotation component or storage service described above in connection with FIGS. 1 and 4. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 600 includes receiving a request to create an encrypted file system 602. The request may be included in a request to create a new file system or may be a request to encrypt an existing file system. In response to the request, the system executing the process 600 may obtain user input 604. The user input may include a user password, credentials, or any other information provided by the user that may be used as an input to generate a metadata key. In addition, the user input may be information provided to the user by the system or other entity such as a system administrator. For example, the user information may include an identification number provided to the user. The system executing the process 600 may then generate a data key 606. The data key may be generated using the user input, a random number, an initialization vector, hardware, software, or combination thereof. In addition, the data key may be a single key or may be comprised of a plurality of keys. The data key may be a symmetric key. The system executing the process 600 may then encrypt the data within the file system using the data key 608. The data may be encrypted using various different encryption algorithms.

The system executing the process 600 may then generate the first metadata key based at least in part on the user input 610. As described above, the metadata key may be generated by providing the user input to a cryptographic hash function. The result of the cryptographic hash function may be used as the metadata key. The metadata key may include a plurality of keys or may be a key pair, such as a public private key pair.

The file system metadata may then be encrypted using the metadata key 612. This operation may be performed by the system executing the process 500 or another system or device, such as a cryptographic module. At this point the entire file system may be encrypted, the data may be encrypted using the data key and the metadata may be encrypted using the metadata key. The file system may be accessed using various techniques described above. The system executing the process 600 may, at some point in time later, determine whether the metadata key has been revoked or otherwise invalidated 614. For example, the system executing the process 600 may cause the metadata key to be rotated at the expiration of an interval of time or epoch, such as once a day or once a week.

If the metadata key has not expired, the system executing the process 600 may continue to utilize the metadata key. However, if the metadata key has expired, the system executing the process 600 may determine if the user input has been revoked or otherwise invalidated 616. If the user input has expired, the system executing the process 600 may return to step 604 and obtain a new user input which may be used to generate a new first metadata key as described above.

However, if the user input has not expired, the system executing the process 618 may decrypt the metadata using the metadata key. The metadata may be decrypted so that it can be re-encrypted with the next metadata key. Once the metadata is decrypted, the system executing the process 600 returns to step 610 and generates the next metadata key based at least in part on the user input. The next metadata key may be generated by performing another iteration of the user input over the cryptographic hash function as described above. Furthermore, the system executing the process 600 may record the number of iterations of the cryptographic hash function performed.

In numerous variations of the process 600, the user input may never expire and/or be revoked. In such embodiments, the system executing the process 600 may simple rotate the metadata key without generating another first metadata key. In addition, one or more of the operations performed in step 602-618 may be performed in various orders and combinations, including in parallel. For example, the metadata may be decrypted while the system executing the process 600 generates the next metadata key. In another variation of the process 600, when the process 600 returned to step 604 to obtain user input after the user input has been revoked, the system executing the process 600 may not generate a new data key and may simply reuse the previous data key. Alternatively, the data key may be rotated at a different interval than the metadata key, and as a result step 606 may be skipped or otherwise not performed until the interval for rotation of the data key has expired.

Figure 7:
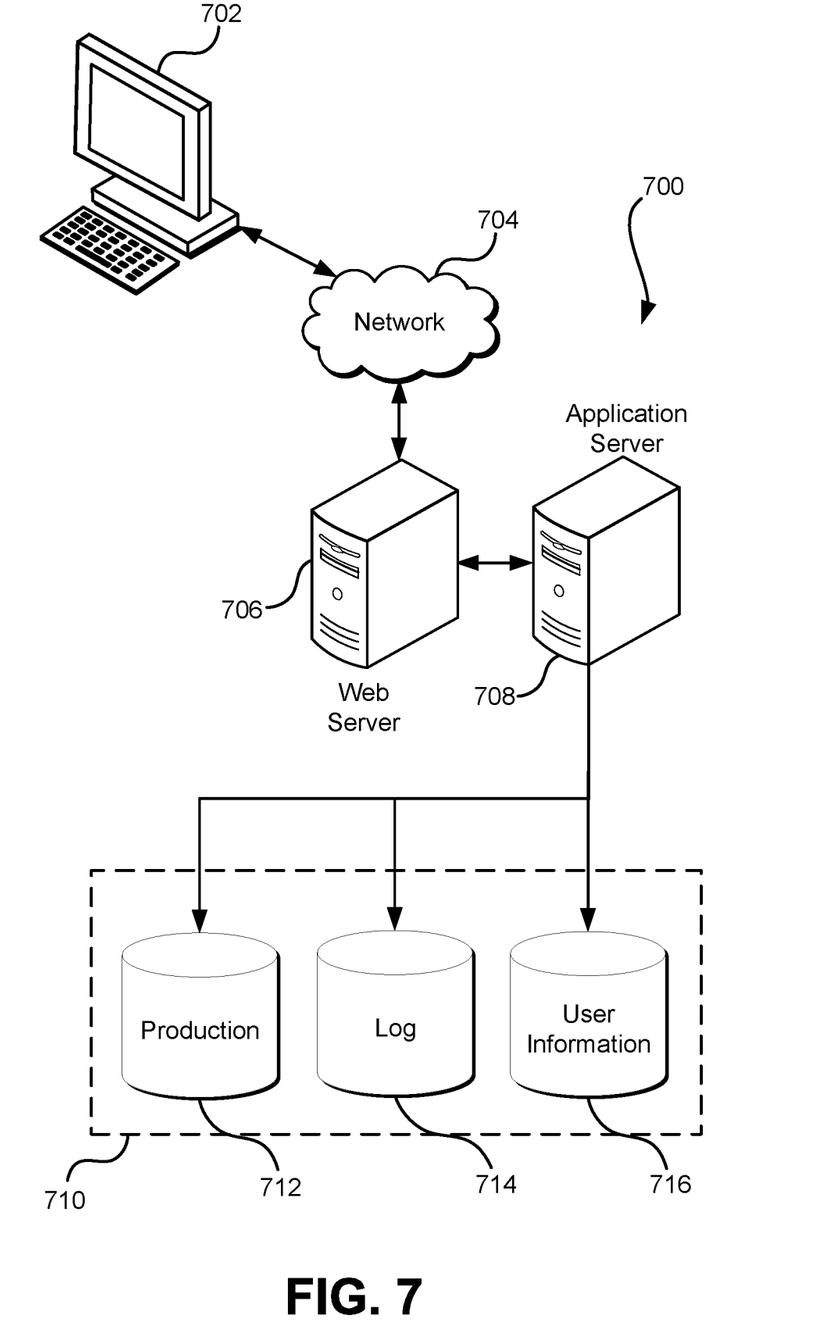
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes, and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    one or more processors; and
    memory including executable instructions that, as a result of being executed by the one or more processors; cause the system to:
        encrypt a set of data objects, maintained within a file system, using a data key;
        encrypt metadata of the file system using a metadata key, wherein the metadata indicates storage addresses of the set of data objects in the file system and the metadata key is generated based at least in part on a user input such that the metadata key can be recreated using the user input;
receive a request to access a data object of the set of data objects maintained within the file system;
decrypt at least a portion of the metadata using the metadata key to obtain a first metadata;
locate the data object in the file system based at least in part on the first metadata;
decrypt the data object using the data key;
rotate the metadata key at a first frequency, wherein the metadata key for each rotation is based at least in part on the user input and a number of iterations of a cryptographic hash function, the number of iterations increased each rotation until a new user input is provided; and
rotate the data key at a second frequency, the first frequency being higher than the second frequency.

2. The system of claim 1, wherein the memory further includes executable instructions that, as a result of being executed by the one or more processors, cause the system to encrypt a portion of the data key with the metadata key by at least including the data key in a root node of the metadata.

3. The system of claim 1, wherein the user input comprises a username and password of a user associated with the file system.

4. The system of claim 1, wherein the executable instructions that cause the system to rotate the metadata key further include executable instructions that, as a result of being executed by the one or more processors, cause the system to generate a next metadata key based at least in part on combining the user input with a random value selected from a plurality of random values.

5. A computer-implemented method, comprising:
generating a metadata key based at least in part on an input and a data key;
encrypting a data object maintained within a file system with the data key;
encrypting metadata of the file system with the metadata key, wherein the metadata indicates a storage location of the data object within the file system; and
rotating the metadata key by at least:
decrypting the metadata of the file system with the metadata key;
generating a new metadata key based at least in part on the input and a number of iterations of the metadata key since the input was provided; and
encrypting the metadata of the file system with the new metadata key.

6. The computer-implemented method of claim 5, wherein the computer-implemented method further comprises encrypting the data key with the metadata key.

7. The computer-implemented method of claim 6, wherein encrypting the data key with the metadata key further comprises storing data key material in a particular location within the metadata of the file system, where the data key material is useable to recreate the data key.

8. The computer-implemented method of claim 5, wherein the computer-implemented method further comprises encrypting a portion of the data object with the metadata key, where the portion of the data object encrypted with the metadata key is indicated in the metadata.

9. The computer-implemented method of claim 8, wherein the portion of the data object encrypted with the metadata key includes a header.

10. The computer-implemented method of claim 5, wherein the computer-implemented method further comprises:
receiving an application program interface request including input and information indicating the data object;
fulfilling the application program interface request by at least:
recreating the metadata key based at least in part on the input;
decrypting the metadata of the file system with the metadata key;
determining a location of the data object based at least in part on the metadata; and
decrypting the data object using the data key; and
returning the data object in response to the application program interface request.

11. The computer-implemented method of claim 5, wherein generating the metadata key further comprises generating the metadata key by at least performing a cryptographic function over the input.

12. The computer-implemented method of claim 5, wherein the computer-implemented method further comprises encrypting a footer of the data object with the metadata key.

13. A non-transitory computer-readable storage medium having stored thereon executable instructions that, as a result of being executed by one or more processors of a computer system, cause the computer system to at least:
receive a request to create a storage volume;
generate a data key useable for encrypting data stored within the storage volume;
generate a metadata key based at least in part on an input obtained from a computing device associated with the storage volume, and a number of iterations of the metadata key since the input was obtained; and
encrypt metadata of the storage volume based at least in part on the metadata key, wherein the metadata indicates a storage address of the data within the storage volume.

14. The non-transitory computer-readable storage medium of claim 13, wherein the instructions further comprise instructions that, as a result of being executed by the one or more processors, cause the computer system to:
determine a rotation interval has been invalidated;
generate a new metadata key using a key rotation scheme; and
encrypt metadata of the storage volume based at least in part on the new metadata key.

15. The non-transitory computer-readable storage medium of claim 14, wherein generating the new metadata key further comprises generating the new metadata key using a particular pseudo-random value of a set of pseudo-random values, the particular pseudo-random value having been selected based at least in part on a particular order assigned to the set of pseudo-random values.

16. The non-transitory computer-readable storage medium of claim 14, wherein the key rotation scheme comprises incrementing a value until the input is modified, the value indicating a number of repetitions performed when generating the new metadata key.

17. The non-transitory computer-readable storage medium of claim 14, wherein the key rotation scheme comprises decrementing a value until the value reaches a threshold at which point the input is modified and the value is reset.

18. The non-transitory computer-readable storage medium of claim 13, wherein the instructions further comprise instructions that, as a result of being executed by the one or more processors, cause the computer system to:

decrypt metadata of the storage volume using the metadata key;

determine one or more locations of data comprising a data object based at least in part on the metadata;

obtain the data comprising the data object from the one or more locations; and decrypt the data using the data key.

19. The non-transitory computer-readable storage medium of claim 18, wherein the instructions that cause the computer system to determine the one or more locations further cause the computer system to trace one or more nodes of the metadata of the storage volume, where the one or more nodes indicate location information for data within the storage volume.

20. The non-transitory computer-readable storage medium of claim 13, wherein the instructions further comprise instructions that, as a result of being executed by the one or more processors, cause the computer system to rotate the data key based at least in part on a key rotation scheme associated with the data key.

* * * * *